May 5, 1953 R. E. WASLEY 2,637,145
MACHINE FOR FORMING ARCUATE CONTOURS
Filed Nov. 12, 1949 3 Sheets-Sheet 1

INVENTOR
ROY E. WASLEY

BY Cook and Ackermerhorn
ATTORNEYS

May 5, 1953          R. E. WASLEY          2,637,145
MACHINE FOR FORMING ARCUATE CONTOURS
Filed Nov. 12, 1949          3 Sheets-Sheet 2
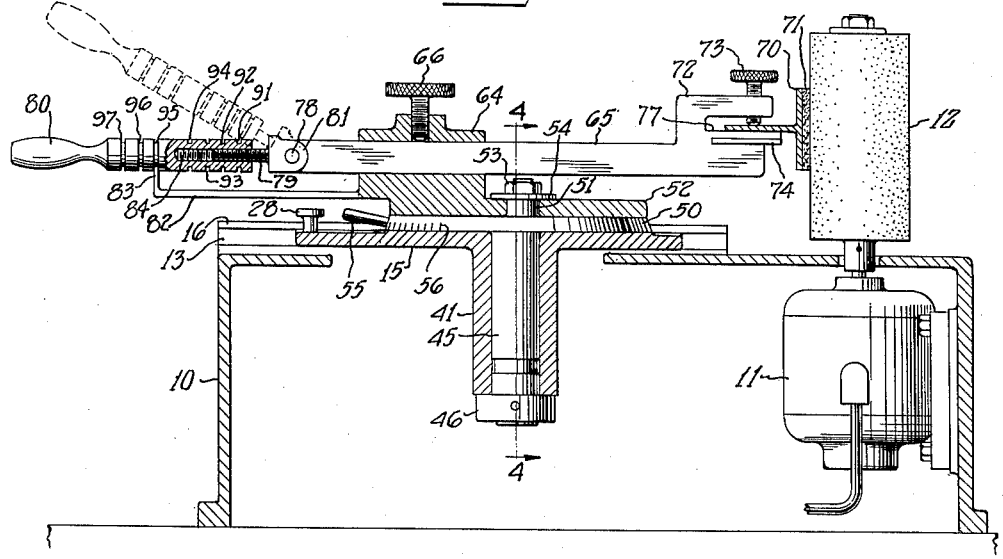
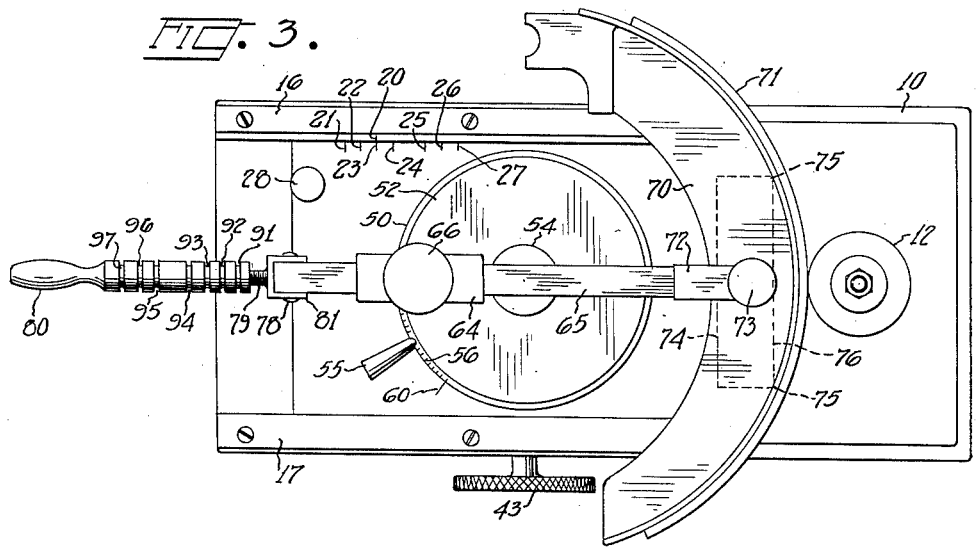
INVENTOR
ROY E. WASLEY
BY Cook and Schermerhorn
ATTORNEYS May 5, 1953   R. E. WASLEY   2,637,145
MACHINE FOR FORMING ARCUATE CONTOURS
Filed Nov. 12, 1949   3 Sheets-Sheet 3
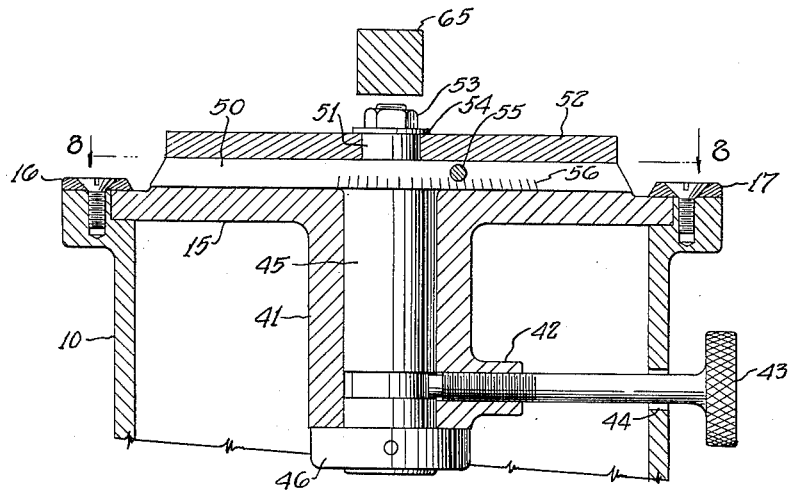
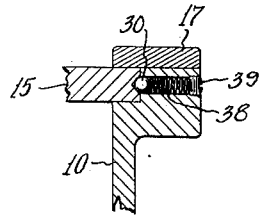
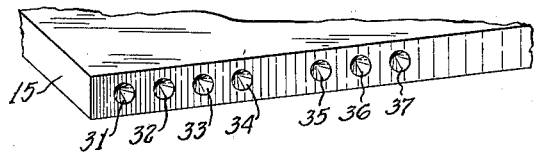
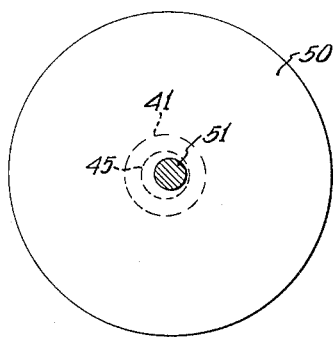
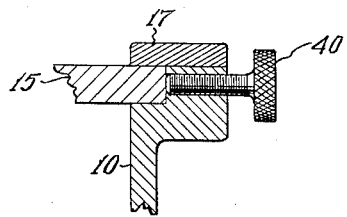
INVENTOR
ROY E. WASLEY
BY Cook and Schermerhorn
ATTORNEYS Patented May 5, 1953

2,637,145

UNITED STATES PATENT OFFICE 2,637,145

MACHINE FOR FORMING ARCUATE CONTOURS

Roy E. Wasley, Portland, Oreg., assignor of one-third to Ralph L. Burke and one-third to Martin R. Chirgwin, both of Portland, Oreg.

Application November 12, 1949, Serial No. 126,888

12 Claims. (Cl. 51—96)

This invention relates to a machine for forming an arcuate contour such as a machine for grinding or dressing down arcuate brake linings to give them the proper curvature to fit the cylindrical brake drums in which they are to be used.

In relining automobile brake shoes it is necessary to make some adjustment of the new lining to insure that it will have the same radius of curvature as the brake drum with which it is used in order that the whole length of the lining on each shoe will engage the brake drum when the brakes are applied, and this is particularly important where the brake drums have a somewhat larger than standard diameter. After a worn brake drum has been turned down to remove grooves and scratches from its braking surface, its inside diameter is greater than in new condition, and it will be apparent that a brake lining having a radius of curvature to fit a standard size drum will no longer properly fit the oversize drum.

When the brake linings are riveted to the brake shoes it has often been the practice to use linings of standard thickness and then insert shims between the linings and the shoes having a thickness equal to the thickness of metal removed from the drum, but this expedient cannot be resorted to when the brake lining material is secured to the shoes by bonding. In such case, the necessary extra thickness must be supplied by the lining itself. There is, therefore, an advantage for brake shoe servicing establishments to adopt the standard practice of grinding the linings in all cases, because it permits the use of the same extra thick linings for all relining work, thereby dispensing entirely with the use of shims and obviating the necessity for stocking linings of different thickness for bonding and riveting and for standard and oversize drums. Each lining, after being mounted on its shoe, is merely ground down to fit the curvature of the drum in which it is to be used.

Conventional grinding machines for this purpose have a number of shortcomings which have limited their widespread adoption by the trade, notwithstanding the recognized desirability of the grinding procedure in general. Presently known machines are costly to manufacture, awkward to adjust, and are susceptible to excessive wear in some of the moving parts by reason of exposure of these parts to the highly abrasive grinder dust. In most machines the complicated nature of the adjustments requires considerable skill on the part of the mechanic to grind the linings to fit properly, whereby little advantage is gained from the use of the machines by a mechanic of only average skill. Also, both the conventional shoe clamping devices and the adjusting mechanisms make the grinding procedure a rather slow and unprofitable operation tending to discourage investment in the expensive machines.

The general object of the present invention therefore is to provide an improved machine for forming an arcuate contour which will overcome the various shortcomings and disadvantages of conventional machines enumerated hereinabove. Particular objects are to provide a machine which is relatively inexpensive to manufacture, which is less subject to wear affecting its accuracy, and which may be used with such speed and facility that high quality of work may be turned out very quickly by a mechanic of only average skill.

Specific objects are to provide novel fast adjustment means to shift the parts into position to accommodate the different standard sizes of brake shoes, to provide mechanical indexing means for the fast adjustment, to provide an improved jig type of clamp for holding a brake shoe in the proper position, to provide improved fast adjustment means to compensate for oversize drums, to provide improved feed means to feed the work piece toward the grinding wheel, and to provide simplified and more convenient adjusting and manipulating devices.

The foregoing and other objects are attained in a machine having an oscillating work holder mounted on a pivot at a distance from a grinding wheel. The pivot is mounted on a base frame for fast adjustment toward and away from the grinding wheel and is located in the proper positions for grinding curvatures of different radii corresponding to standard sizes of brake shoes by mechanical indexing means as distinguished from the usual visual indicator. A finer adjustment to compensate for oversize drums is provided to adjust the pivot relative to said indexed positions. In the present embodiment this fine adjustment is effected by the rotation of an eccentric mounting for the pivot.

The oscillating work holder is mounted for radial movement relative to its pivotal support to provide both a slow screw feed and also a fast, sliding adjustment. A single handle oscillates the work holder to pass the workpiece over the grinding wheel and also has direct longitudinal movement to make the fast sliding adjustment and rotational movement to operate the screw feed. Thus, the preparatory adjustments are all of a quick-acting type which are independent of the screw feed used during the course of the grinding operation.

The invention will be better understood from the description in the following specification relating to the preferred embodiment illustrated in the accompanying drawings. Various changes may be made, however, in the details of construction and arrangement of parts and certain features may be used without others, as will be apparent to persons skilled in the art. Although the machine is illustrated and described as a brake shoe grinding machine it may obviously be adapted to the grinding or machining of arcuate surfaces on other types of work pieces and involving the treatment of materials other than brake lining materials.

In the drawings:

Figure 2 is a longitudinal sectional view taken on the line 2—2 of Figure 1;

Figure 3 is a top plan view of the machine;

Figure 4 is a cross sectional view taken on the line 4—4 of Figure 2;

Figure 5 is a perspective view of one edge of the slide plate supporting member showing the series of depressions which are engaged by spring detent indexing means;

Figure 6 is a fragmentary sectional view taken on the line 6—6 of Figure 1;

Figure 7 is a fragmentary sectional view taken on the line 7—7 of Figure 1; and

Figure 8 is a sectional view taken on the line 8—8 of Figure 4.

Figure 1:
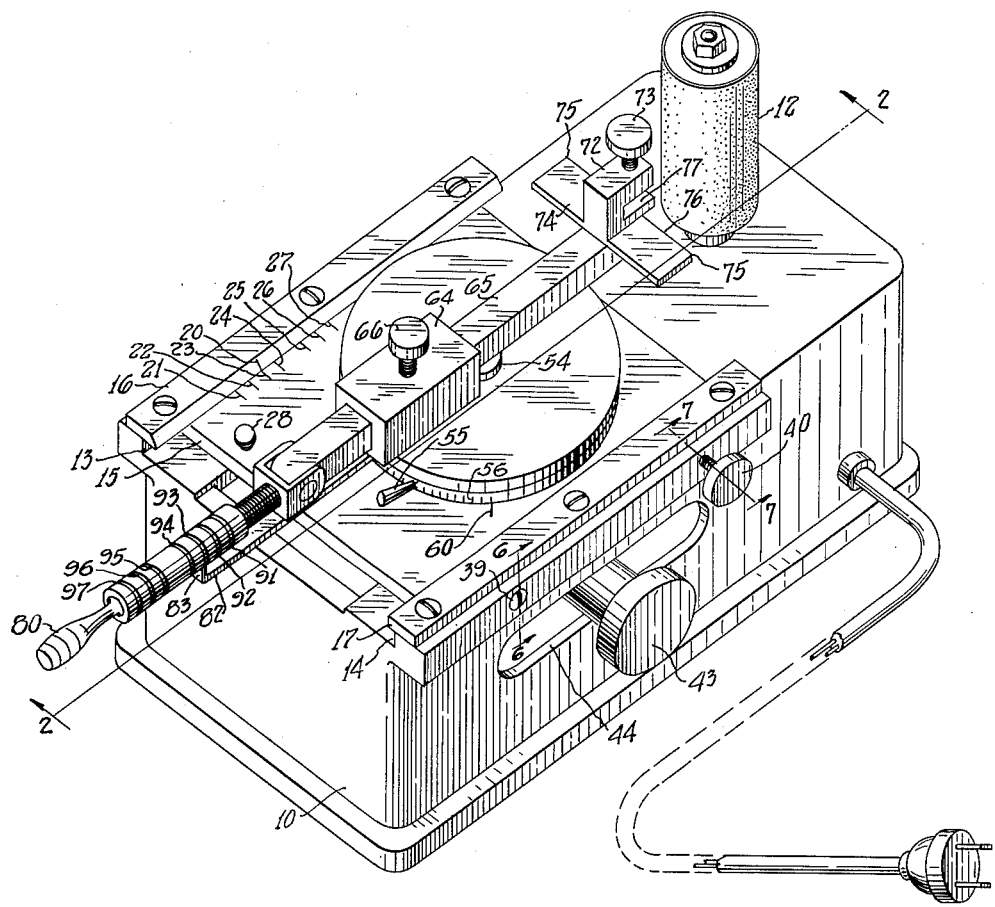
Figure 1 is a perspective view of the machine of the invention.

The various parts of the machine are mounted upon and carried by a rigid base frame 10. Within the base frame 10 there is mounted an electric motor 11 to drive a tool 12 which in the present embodiment is a cylindrical grinding wheel having a suitable abrasive surface for dressing down the material of automobile brake linings. The top of the base frame 10 is equipped on its opposite sides with longitudinal ways 13 and 14 for a carriage in the form of a slide plate supporting member 15. The opposite side edges of the plate 15 have sliding engagement with the ways 13 and 14 and the latter are either shaped to prevent uplift of the plate or equipped with hold-down plates 16 and 17 for that purpose and to exclude grinder dust.

On the hold-down plate 16, which is rigidly connected with the base frame 10, there is an index mark 20 and on one side of the plate 15 there is a plurality of scale marks 21 to 27 to cooperate therewith, designating standard sizes of automobile brake drums. The plate 15 may be moved longitudinally in simple sliding movement for fast adjustment by means of handle 28 to position any selected one of these scale marks at the index mark 20.

The opposite side edge of plate 15 is equipped with a corresponding series of conical indexing depressions 31—37 as shown in Figure 5 to be resiliently engaged by the ball detent 30 shown in Figure 6. Ball detent 30 is urged against the edge of the plate and into any one of these depressions by a spring 38 seated against screw 39. Spring 38 has sufficient force and the plate 15 slides with sufficient freedom to cause the ball 30 to exert a cam action against the sloping walls of each depression to automatically center the depression accurately on the ball once the ball has entered into the depression. It is to be understood therefore that the indexing of the plate 15 is mechanical and does not depend upon the careful alignment of scale marks 21 to 27 with index mark 20.

The depressions 31–34 are accurately spaced on one-half inch centers, and the corresponding scale marks 21–24 are similarly spaced and positioned relative to the index mark 20, for use with 9, 10, 11 and 12 inch brake shoes, respectively, the dimension having reference to the diameter of the brake drum. The depression 35 is spaced one inch from depression 34 and then the depressions 36 and 37 are spaced at one-half inch intervals, and the scale marks 25, 26 and 27 are similarly spaced, for use with 14, 15 and 16 inch brake shoes. These are the standard diameters of the most commonly used brake drums on passenger cars and light trucks, and the purpose of this arrangement of the edge depressions and scale marks on the slide plate 15 will become apparent as the description proceeds. The slide plate 15 may be locked securely in any one of its indexed positions by means of clamp screw 43 which engages a smooth surfaced portion of the edge of the plate 15 where there are no indexing depressions, as shown in Figure 7.

The slide plate 15 carries an integral depending hub 41 equipped on one side with an internally screw threaded boss 42 receiving a clamp screw 43 as shown in Figure 4. This clamp screw has an elongated shank extending through a horizontal slot 44 in the base frame 10 to accommodate the longitudinal movement of the slide plate. The hub 41 forms a vertical bearing for a short length of shaft 45 integrally attached to the under side of an adjustable circular base plate 50. Shaft 45 is retained in the hub 41 by a collar 46 on its lower end. On its top side the base plate 50 carries an upstanding stud 51 which forms a pivot for a circular oscillating plate 52. The oscillating plate is secured on the pivot by a nut 53 having a flange or washer 54 to exclude abrasive dust from the bearing surface of the pivot.

Adjustment of the pivot stud 51 relative to the indexed positions of slide plate 15 is effected by the eccentric relationship of stud 51 and shaft 45 which is illustrated to an exaggerated degree in Figures 2 and 8. Adjustable base plate 50 is equipped with a handle 55 to rotate it, and scale markings 56 extending around a portion of its periphery to cooperate with an index mark 60 on the plate 15. The scale marks 56 are so placed on the adjustable base plate 50 as to indicate zero position with reference to the index mark 60 when stud 51 is closest to grinding wheel 12, as shown in Figure 2. Rotation of plate 50 away from its zero position thereby increases the distance of stud 51 from the grinding wheel by an amount which may be indicated in thousandths of an inch on the scale 56, independently of the adjustment of the slide plate 15 relative to its index mark 20. Plate 50 is secured in adjusted position by tightening the clamp screw 43 against shaft 45.

Oscillating plate 52 carries a radial guide block 64 for a work holding arm 65 which slides longitudinally therein. The arm may be clamped in adjusted position by a set screw 66. The brake shoe having the lining to be ground is clamped on one end of the arm 65 so that it may be passed across the surface of grinding wheel 12 with a circular swinging motion centered on pivot stud 51. The brake shoe which constitutes the workpiece in the present embodiment is designated at 70 and its lining at 71 in Figures 2 and 3, the work holder thereby constituting a brake shoe clamp, or jig. The shoe is removed from the arm in Figure 1.

The brake shoe clamp comprises a C-shaped clamp member 72 equipped with a clamp screw 73 and a short cross arm 74 having corners 75 spaced equidistantly on opposite sides of the arm 65 to engage the inside surface of the arcuate portion of the shoe, as shown in Figure 3. The edge 76 of the cross arm 74 which connects the two corners 75 forms a chord across an arc of the brake shoe perpendicular to the longitudinal center line of arm 65 so that the geometric center of the arc will always lie in this center line. The clamp parts thus form a convenient jig for a shoe of the usual T-shaped cross section wherein the two corners 75 locate the geometric center of the arc of the shoe precisely on the longitudinal center line of arm 65 and wherein a flat clamping surface 77 furnishes a horizontal table-like support for the web of the shoe to maintain the axis of the cylindrical surface of the lining parallel with the axis of the cylindrical grinding surface. This type of clamp permits excessive tightening of the screws 73 without danger of warping the shoe out of its normal shape, but the shoe is securely held with only ordinary hand tightening of the screw. The geometric relationship just described is obviously the same regardless of the radius of curvature or length of the shoe.

The other end of the work holding arm 65 carries a horizontal pivot pin 78 for a screw-threaded handle stud 79 in a handle 80. In the present embodiment, the stud 79 has an integral U-shaped bracket 81 to receive the ends of pin 78 so that the handle may be raised as shown in broken lines in Figure 2. When the handle is thus raised and the clamp screw 66 loosened, the arm 65 may be caused to slide through the guide block 64 to move the brake shoe toward or away from the pivot 51. The slide block 64 is also equipped with a horizontal arm 82 having an upstanding handle rest 83 at its extremity. The handle is internally screw-threaded at 84 to fit the stud 79, and on its exterior surface the handle has a series of grooves 91 to 97 to engage the rest 83 in different positions of the arm 65.

Thus, when the handle is raised on its pivot 78, the arm 65 may be moved longitudinally in fast adjustment to place one of the grooves 91 to 97 in engagement with the handle rest 83. The handle may then be rotated on the rest 83 to provide a screw feed movement for the arm 65 in approaching the grinding wheel. In this screw feed movement, the handle 80 acts as a nut and the rest 83 as a thrust abutment for the nut to cause stud 79 and arm 65 to move longitudinally relative thereto. When handle 80 is swung from side to side, the brake lining 71 on shoe 70 is swept across the surface of grinding cylinder 12 in an arc centered on the axis of stud 51. Any variations in the thickness of the arcuate parts of different brake shoes are removed by operation of the feed screw adjustment of handle 80 without altering the length of the radius of swing existing between the axis of stud 51 and the surface of the grinding wheel.

To illustrate the adjustability of the work holding arm 65 the handle rest 83 is shown in Figure 1 engaged in the groove 93 to dress a brake shoe for an eleven inch drum, the corresponding scale mark 23 on slide plate 15 being located at the index 20 by engagement of ball detent 30 in depression 33. In Figure 2, however, the handle rest 83 engages the groove 95 for dressing a brake shoe to fit a fourteen inch drum, and in this case, the scale mark 25 would be set at index 20 with detent 30 seated in depression 35. It is apparent that the shifting of the parts from the eleven inch shoe position shown in Figure 1 to the fourteen inch shoe position shown in Figure 2 involves no turning of screw adjustments but only the sliding of slide plate 15 two scale markings to the left in fast adjustment and the sliding of work holding arm 65 two handle grooves to the right in fast adjustment.

Such sliding adjustments are herein designated as fast adjustments to distinguish from the ordinary screw feed adjustments which are extremely slow acting adjustments. The possibility of error in these sliding adjustments is eliminated by the provision of positive mechanical indexing means which serve as stops and abutments for the adjustable members to obviate reliance upon visual measuring devices which depend for accuracy upon the skill and carefulness of the operator.

Assuming now that the brake linings are to be dressed on brake shoes to fit fourteen inch drums in new condition, one of the shoes is approximately centered in the clamp 72 with the web of the shoe lying flat on the clamping surface 77 and the rim of the shoe engaging the two corners 75 of the cross arm 74. Slide plate 15 is moved in fast adjustment to seat ball detent 30 in depression 35, placing scale mark 25 at the index mark 20, and the work carrying arm 65 is moved longitudinally through the guide block 64 in fast adjustment until the handle groove 95 will engage the rest 83 as shown in Figure 2. Adjustable base plate 50 is rotated by handle 55 to place the zero mark on scale 56 at the index mark 60.

Then when the handle 80 is swung from side to side and rotated to impart sufficient feed movement to work holding arm 65, the drum engaging surface of lining 71 will be dressed down by grinding wheel 12 to a true circular arc having exactly the same radius of curvature as its fourteen inch drum. Screw feed movement of the handle 80 is necessary only for the purpose of removing the high spots; as soon as the grinding wheel starts to act on the whole length of the lining it is apparent that the desired true circular arc has been obtained and that the grinding operation on that shoe is completed. After one shoe of a set has been dressed in this manner, it is often found to be unnecessary to make any further rotative feed adjustment of the handle 80 in dressing the remaining shoes in cases where the removal of a considerable depth of material is not required, and then the clamp screw 66 may be tightened if desired. The center of the oscillatory movement of the brake shoe when the handle 80 is swung from side to side is, of course, the axis of the pivot stud 51 and not the axis of shaft 45 which is clamped in its zero position in the present example.

Let it be assumed now that one of the drums had been badly scored and that in order to provide a smooth braking surface in the drum it had to be turned down on a lathe until a depth of 0.050 inch of metal had been removed, so as to increase the inside drum radius by that amount. The same dressing procedure would be followed except that adjustable base plate 50 would be rotated by its handle 55 to place the 0.050 mark on scale 56 at the index mark 60. This adjustment of the plate 50 would thereby turn the shaft 45 through an angle sufficient to move the eccentric stud 51 to a position 0.050 inch farther away from the surface of grinding wheel 12. Then upon oscillation of the work holding arm 65 about the stud 51 as a center, the radius of curvature of the dressed surface of lining 71 would be 7.050 inches instead of 7.000 inches. It will be apparent again that this grinding radius is not altered by any longitudinal feed movement that may have to be imparted to the work holding arm 65 by rotating the handle 80, inasmuch as the center of oscillation of the brake shoe in the grinding operation is determined solely by the position of slide plate 15, and the position of eccentric stud 51 relative to plate 15. Any movements of work holding arm 65 in its guide block 64 do not change the distance between pivot stud 51 and the grinding wheel.

The present eccentric adjustment obtained by rotating plate 50 to vary the distance of the pivotal center of the work holding arm 65 from the grinding wheel is to be distinguished from known eccentric adjustments for other purposes which do not change the distance between the pivotal center of the work holding arm and the grinding wheel. It has heretofore been proposed, for example, to provide an eccentric adjustment to shift the work holding arm or carrier in a lateral direction from its pivot, perpendicular to a line drawn between the axis of oscillation of the work holder and the point of contact of the brake shoe with the grinding wheel, but in such adjustments the work holder is merely shifted relative to its axis of oscillation to compensate for inaccurate positioning of the shoe in the work holder, without changing the radius distance from the axis of oscillation to the grinding surface. The purpose of such prior eccentric adjustment is to obviate the former practice of tapping the ends of the shoe to make them equidistant from the pivot axis where the clamp itself will not automatically accomplish this function. The present improved form of work holding clamp automatically positions shoes of different sizes so that their ends are equidistant from the pivot without tapping or any other lateral adjustment.

In such prior known eccentric adjustments, the eccentricity must be rather large to have the desired effect, whereas for the purpose of the present invention, the eccentricity of stud 51 relative to shaft 45 is so small as to have a negligible side throw, none of which occurs between the pivot and the work holding member. The eccentricity of stud 51 need only be equal to half the maximum depth of metal that could safely be removed in re-turning old brake drums, to provide complete compensation in 180 degrees of rotation of plate 50. In practice, the eccentricity is preferably made a little greater than half the maximum depth of metal which may be removed from a brake drum, in order to shorten the scale 56 and reduce the adjusting movement of plate 50 to provide a true, quick-acting adjustment. It is considered that the maximum depth of metal which may be safely removed in turning worn brake drums is 0.125 inch which is equal to two sixteenths of an inch. Hence an eccentricity of only one sixteenth inch would provide full compensation by rotating plate 50 through 180°, and an eccentricity of two sixteenths of an inch would shorten the scale 56 to 90° of the periphery of plate 50.

It is to be noted that the present eccentric adjustment is a fast adjustment as well as a fine adjustment but it is generally referred to in the claims as a fine adjustment to distinguish from the fast long range sliding adjustments in other parts of the device. Advantages of the eccentric adjustment as a calibrated fine adjustment are that it is subject to less wear than the usual micrometer screw type and that it may more easily be shielded from the grinder dust.

It will be apparent from the foregoing description that the handle 28 is not necessary to move the slide plate 15 as this function is even more conveniently accomplished by the oscillating handle 80 when the latter is engaged with its handle rest 83 or when the clamp screw 66 is tightened. Thus the operator may perform four different functions with the single handle 80. This handle will oscillate the work holder, make the fast sliding adjustment of the work holder relative to its pivotal support, operate the slow screw feed for the work holder, and also make the fast sliding adjustment of the pivot toward and away from the grinding wheel. Hence the fast sliding adjustment of pivot 51 has the additional advantage of being operable directly by the handle 80 whereas in the conventional forms of such machines it is impossible to move the pivot by means of the oscillating handle.

A suitable suction hood may be provided in a manner well understood in the art to dispose of the grinder dust.

Having now described my invention and in what manner the same may be used, what I claim as new and desire to protect by Letters Patent is:

1. In a machine for forming an arcuate contour on a workpiece, a power operated tool for removing material from the workpiece, an oscillating work holding member, a pivot for said oscillating member mounted for movement toward and away from said tool through a long range of adjustment to form contours of different radius, releasable detent indexing means for locating said pivot at different predetermined distances from said tool, fast adjustment means for moving said pivot throughout said long range to position said pivot at said indexed distances, fine adjustment means for moving said pivot a short distance relative to each of said indexed positions, a handle movably mounted on said work holding member for oscillating said work holding member, fast adjustment means operable by said handle in one position relative to said work holding member for moving said work holding member relative to said pivot, and screw feed means for said member operable by said handle in another position.

2. In a machine for treating a workpiece, a base frame, a power operated tool on said base frame, an oscillating work holder, a member having a pivot for said work holder, an intermediate member between said base frame and said pivot member movable with said pivot member for fast long range adjustment of said pivot member to different distances from said tool, releasable detent means for mechanically indexing said intermediate member in a plurality of different predetermined positions relative to said base frame throughout the range of movement of said pivot member, and fine adjustment means for positioning said pivot member toward or away from said tool relative to said intermediate member.

3. In a machine for forming an arcuate contour on a workpiece, a power operated tool for removing material from the workpiece, a supporting member mounted for fast long range adjustment toward and away from said tool, an oscillating work holder, a pivot for said oscillating work holder, a fine adjustment rotatable support for said pivot having an axis of rotation parallel and eccentric to the axis of said pivot, and means for mounting said rotatable support on said supporting member for rotation on said axis of the support, the distance of said pivot from the tool being determined in part by the position of said supporting member in said long range adjustment and in part by the rotatable fine adjustment of said rotatable support relative to said supporting member.

4. In a machine for forming an arcuate contour on a workpiece, a power operated tool for removing material from the workpiece, a supporting member mounted for fast long range adjustment toward and away from said tool, releasable detent indexing means for locating said supporting member at different predetermined distances from said tool throughout said range, an oscillating work holder having a handle movable to two operative positions relative to the work holder, a pivot for said oscillating work holder, eccentric mounting means for said pivot on said supporting member to adjust the position of the oscillating axis of said pivot toward and away from said tool relative to the indexed position of said supporting member, fast adjustment means operable by said handle in one of said operative positions for moving said work holder relative to said pivot, and slow feed means for said work holder operable by said handle in its other position.

5. In a brake shoe grinding machine, a grinding tool, an oscillating work holder, a pivot for said oscillating work holder, means for mounting said pivot for long range fast sliding adjustment toward and away from said tool, releasable detent indexing means for locating said pivot at different predetermined distances from said tool for standard sizes of brake shoes within the range of said fast adjustment, said mounting means including fine adjustment means for moving said pivot a short distance relative to each indexed position, and a handle movably mounted on said work holder for oscillating said work holder, said handle having free longitudinal movement in one position relative to the work holder for fast adjustment of said work holder relative to said pivot, and slow feed means for said work holder operable by rotation of said handle in another position of the handle.

6. In a brake shoe grinding machine and the like, a grinding tool, an oscillating member, a pivot for said oscillating member spaced from said grinding tool, a sliding work holder on said oscillating member, a handle for oscillating said member and holder, a pivotal connection between said handle and said work holder for movement of the handle perpendicular to the plane of oscillation of said member, a handle rest on said oscillating member having abutment means to engage the handle, and screw feed means on the handle operative on said work holder when the handle is engaged with said rest, said handle having fast longitudinal movement with said work holder for coarse adjustment of the work holder when the handle is not engaged with said rest.

7. In a brake shoe grinding machine, a grinding tool, a supporting member mounted for long range fast sliding adjustment toward and away from said tool, releasable detent indexing means for locating said supporting member at different predetermined distances from said tool for standard sizes of brake shoes within the range of said fast adjustment, an oscillating work holder, a pivot for said oscillating work holder, and eccentric means for mounting said pivot on said supporting member for fine adjustment of the oscillating axis toward and away from said tool relative to the indexed positions of said supporting member.

8. In a brake shoe grinding machine, a grinding tool, an oscillating work holder member, a pivot for said oscillating member mounted for movement toward and away from said tool, releasable detent indexing means for locating said pivot at a different predetermined distance from said tool for each standard size of brake shoe to be treated, fast long range adjustment means for moving said pivot to said indexed positions, fine adjustment means for moving said pivot a short distance relative to each indexed position to compensate for oversize brake drums, fast long range adjusting means for moving said work holding member relative to said pivot, slow feed means for said work holding member, a handle movably mounted on said work holding member for oscillating said work holding member, and means for imparting either fast adjustment or slow feed to said work holding member by manipulation of said handle in different positions relative to said work holding member.

9. A brake shoe grinding machine comprising a base frame, a grinding wheel mounted on said base frame, a supporting member mounted on said base frame for long range fast sliding movement toward and away from said grinding wheel, releasable detent means for indexing said supporting member to a plurality of different predetermined positions for standard sizes of brake drums, a pivot member mounted for rotative adjustment on said supporting member and having a pivot axis eccentric to the axis of said rotative adjustment, index and scale markings on said supporting member and pivot member designating radius oversize measurements of a brake drum and shoe, an oscillating member mounted on said pivot for oscillation about said pivot axis, a work holder mounted on said oscillating member for sliding adjustment toward and away from said pivot, a handle on said work holder for oscillating the work holder relative to said grinding wheel, a handle rest on said oscillating member, and screw feed means on said handle for imparting screw feed movement to said work holder when the handle is rotated on said rest, said handle being movable longitudinally for fast adjustment of the work holder when disengaged from said rest.

10. In a grinding machine for different size brake shoes of T-shaped cross section having an arcuate rim portion and a flat web portion, a work holding member comprising an oscillating arm, a flat clamping surface on said arm to engage only a central portion of the web of the brake shoe, a clamp screw opposed to said surface for clamping a single point on said web portion against said surface, a cross arm offset from said clamping surface and extending laterally on opposite sides of said clamping surface to engage only two spaced points on the arcuate rim portion of said shoe without engaging said web to define a chord between said points perpendicular to said arm so that the center of curvature of said arcuate portion of the shoe will lie in the longitudinal center line of said arm, and a pivotal support for said arm having its pivotal axis intersecting said center line of the arm.

11. In a brake shoe grinding machine and the like having a grinding member and an oscillating work holder, a pivot for said work holder mounted for fast long range adjustment toward and away from said grinding member, means supporting said work holder on said pivot for fast adjustment relative to said pivot to vary the radius of oscillation of a workpiece in said work holder, a handle movably mounted on said work holder for oscillating said work holder and for making both of said fast adjustments, and screw feed means for said work holder on said handle, said handle having one position relative to said work holder to operate said screw feed means and adjust said pivot and another position to make fast adjustment of said work holder.

12. A brake shoe grinding machine comprising a grinding tool, an oscillating member, a support for said oscillating member having a vertical pivot, means for mounting said support for long range fast adjustment of said pivot toward and away from said tool, releasable detent indexing means for locating said pivot at a plurality of different distances from said tool throughout said long adjustment range corresponding to radii of standard sizes of brake shoes, a short range fine adjustment means for moving said pivot relative to each of said indexed positions to introduce a correction for slightly oversize brake drums, a sliding work holder on said oscillating member, a handle for oscillating said member and work holder mounted on a horizontal pivot on said work holder, a handle rest on said oscillating member having abutment means engageable with the handle to prevent sliding movement of said handle, and screw feed means on said handle operative on said work holder when said handle is engaged with said rest, said handle when engaged with said rest being operative to effect said long range fast adjustment of said vertical pivot and when disengaged from said rest being operative to effect fast sliding adjustment of said work holder.

ROY E. WASLEY.

References Cited in the file of this patent
UNITED STATES PATENTS

| Number | Name | Date |
|---|---|---|
| 1,649,695 | Higgins | Nov. 15, 1927 |
| 1,662,078 | Severson | Mar. 13, 1928 |
| 2,102,915 | Rishel | Dec. 21, 1937 |
| 2,225,806 | Stone | Dec. 24, 1940 |
| 2,304,530 | Bigelow | Dec. 8, 1942 |
| 2,325,826 | Barrett | Aug. 3, 1943 |
| 2,345,161 | Thomason | Mar. 28, 1944 |
| 2,441,004 | Bieberich | May 4, 1948 |